United States Patent
Chen et al.

(10) Patent No.: US 11,134,495 B2
(45) Date of Patent: Sep. 28, 2021

(54) DATA PROCESSING METHOD BASED ON RADIO ACCESS TECHNOLOGY, AND TRANSMISSION NODE

(71) Applicant: XI'AN ZHONGXING NEW SOFTWARE CO., LTD., Xi'an (CN)

(72) Inventors: Zewei Chen, Guangdong (CN); Bo Dai, Guangdong (CN); Jin Xu, Guangdong (CN); Jun Xu, Guangdong (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 293 days.

(21) Appl. No.: 15/780,216

(22) PCT Filed: Nov. 25, 2016

(86) PCT No.: PCT/CN2016/107325
§ 371 (c)(1),
(2) Date: May 30, 2018

(87) PCT Pub. No.: WO2017/092625
PCT Pub. Date: Jun. 8, 2017

(65) Prior Publication Data
US 2018/0368129 A1    Dec. 20, 2018

(30) Foreign Application Priority Data
Nov. 30, 2015    (CN) .............................. 201510862786

(51) Int. Cl.
*H04W 72/04*        (2009.01)
*H04W 48/16*        (2009.01)
(Continued)

(52) U.S. Cl.
CPC ......... *H04W 72/048* (2013.01); *H04W 48/18* (2013.01); *H04W 72/0446* (2013.01);
(Continued)

(58) Field of Classification Search
CPC ......... H04W 72/0446; H04W 72/0453; H04W 72/048; H04W 88/06; H04W 72/044;
(Continued)

(56) References Cited

U.S. PATENT DOCUMENTS 8,792,365 B2 *    7/2014    Chin ................ H04W 36/0066
                                                        370/252
8,897,802 B2     11/2014    Meredith et al.
(Continued)

FOREIGN PATENT DOCUMENTS

CN        103188761 A        7/2013
CN        103563454 A        2/2014
CN        104661270 A        5/2015

OTHER PUBLICATIONS

International Search Report dated Feb. 23, 2017 for International Application No. PCT/CN2016/107325, 6 pages.
(Continued)

*Primary Examiner* — Ahmed Elallam
(74) *Attorney, Agent, or Firm* — Knobbe, Martens, Olson & Bear, LLP

(57) ABSTRACT

Provided are a data processing method based on a radio access technology, and a transmission node. The method includes: selecting, by a first transmission node, a radio access technology (RAT) according to a specific rule, where the specific rule includes selecting the RAT according to at least one of the following: a coverage level, a frequency domain bandwidth, a resource unit type, a transmission mode, a pre-configuration of a first node, and a second transmission node capability; the RAT includes at least one of the following: a multiple access mode, a modulation mode, a sub-carrier spacing, and a maximum number of carriers used for carrying data; and the second transmission node capability is defined according to an RAT supported by a second transmission node; and receiving or sending, by the
(Continued)

A first transmission node selects a radio access technology (RAT) according to a specific rule, where the specific rule includes selecting the RAT according to at least one of the following: a coverage level, a frequency domain bandwidth, a resource unit type, a transmission mode, a pre-configuration of a first node, and a second transmission node capability; the RAT includes at least one of the following: a multiple access mode, a modulation mode, a sub-carrier spacing, and a maximum number of carriers used for carrying data; and the second transmission node capability is defined according to an RAT supported by a second transmission node    — S102

The first transmission node receives or sends data on a radio resource unit corresponding to the selected RAT according to the selected RAT    — S104 first transmission node, data on a radio resource unit corresponding to the selected RAT according to the selected RAT.

20 Claims, 5 Drawing Sheets

(51) Int. Cl.
*H04W 48/18* (2009.01)
*H04L 5/00* (2006.01)
(52) U.S. Cl.
CPC ............ *H04L 5/001* (2013.01); *H04L 5/0053* (2013.01); *H04W 72/044* (2013.01); *H04W 72/0453* (2013.01)
(58) Field of Classification Search
CPC . H04W 72/1215; H04W 16/14; H04W 88/10; H04W 92/00; H04W 48/16; H04W 8/005; H04W 48/18; H04W 48/17; H04W 48/20; H04W 28/0819; Y02D 70/10
See application file for complete search history.

(56) References Cited

U.S. PATENT DOCUMENTS

| | | | |
|---|---|---|---|
| 9,232,525 | B2 | 1/2016 | Meredith et al. |
| 9,258,769 | B2 * | 2/2016 | Ore ...................... H04W 48/20 |
| 9,392,496 | B2 | 7/2016 | Low et al. |
| 9,510,275 | B2 * | 11/2016 | Sebeni .................. H04W 48/16 |
| 9,510,279 | B2 | 11/2016 | Choi et al. |
| 9,510,355 | B2 | 11/2016 | Meredith et al. |
| 9,544,841 | B2 * | 1/2017 | Cui ....................... H04W 48/04 |
| 10,070,474 | B2 * | 9/2018 | Wietfeldt .............. H04L 67/104 |
| 10,419,961 | B2 * | 9/2019 | Lee ........................ H04W 24/10 |
| 10,505,810 | B2 * | 12/2019 | Li ......................... H04L 41/0893 |
| 2009/0104907 | A1 * | 4/2009 | Otting ................... H04W 48/10 |
| | | | 455/435.3 |
| 2010/0009676 | A1 * | 1/2010 | Cormier ................. H04L 45/52 |
| | | | 455/426.1 |
| 2010/0075665 | A1 * | 3/2010 | Nader .................. H04J 11/0093 |
| | | | 455/426.1 |
| 2011/0032911 | A1 * | 2/2011 | Choi ..................... H04W 48/18 |
| | | | 370/335 |
| 2011/0244874 | A1 * | 10/2011 | Fodor ................... H04W 48/18 |
| | | | 455/450 |
| 2013/0023274 | A1 | 1/2013 | Meredith et al. |
| 2013/0137423 | A1 | 5/2013 | Das et al. |
| 2014/0274065 | A1 | 9/2014 | Low et al. |
| 2014/0355521 | A1 | 12/2014 | Choi et al. |
| 2015/0045051 | A1 | 2/2015 | Meredith et al. |
| 2016/0081095 | A1 | 3/2016 | Meredith et al. |
| 2016/0262154 | A1 * | 9/2016 | Alsohaily ............. H04W 16/14 |
| 2018/0007673 | A1 * | 1/2018 | Fwu ....................... H04W 4/70 |
| 2018/0331798 | A1 * | 11/2018 | Nammi ................. H04L 5/0042 |
| 2019/0044690 | A1 * | 2/2019 | Yl .............................. H04L 5/14 |
| 2019/0059052 | A1 * | 2/2019 | Nord ..................... H04W 36/14 |

OTHER PUBLICATIONS

Written Opinion of the International Searching Authority dated Feb. 23, 2017 for International Application No. PCT/CN2016/107325, 6 pages.

* cited by examiner

DATA PROCESSING METHOD BASED ON RADIO ACCESS TECHNOLOGY, AND TRANSMISSION NODE

CROSS REFERENCE TO RELATED APPLICATIONS

This application the U.S. National Phase Application under 35 U.S.C. § 371 of International Application No. PCT/CN2016/107325, filed Nov. 25, 2016, designating the U.S. and published as WO 2017/092625 A1 on Jun. 8, 2017 which claims priority to Chinese Application No. 201510862786.2, filed on Nov. 30, 2015, the entire disclosure of each of which is hereby incorporated by reference.

TECHNICAL FIELD

The present disclosure relates to communications and, in particular, to a data processing method based on a radio access technology, and a transmission node.

BACKGROUND

In wireless communication systems, different users use multiple access technologies to share wireless communication resources. Common multiple access technologies include Frequency Division Multiplexing Access (FDMA), Time Division Multiplexing Access (TDMA), Code Division Multiplexing Access (CDMA), Orthogonal Frequency Division Multiplexing Access (OFDMA) and Single Carrier-Orthogonal Frequency Division Multiplexing Access (SC-OFDMA).

For Long Term Evolution (LTE) system in Release 12, the SC-OFDMA technology and the OFDMA technology are used in uplink and downlink respectively. In LTE Release 13, the Narrow Band-Internet of Things (NB-IOT) technology starts to be studied. The NB-IOT uplink transmission involves two multiple access technologies: the FMDA technology based on Gaussian Filtered Minimum Shift Keying (GMSK) modulation, and the SC-OFDMA technology. The FDMA technology based on GMSK modulation is featured by a low Peak to Average Power Ratio (PAPR), helping improve power amplification efficiency and thereby limiting terminal costs and ensuring coverage. The FDMA technology based on GMSK modulation has the advantage of being insensitive to timing precision but has the disadvantage of relatively low spectral efficiency. SC-OFDMA has the advantage of high spectral efficiency but, in general, has a larger PAPR than the FMDA technology based on GMSK modulation and requires a higher timing precision. The PAPR of LTE SC-OFDMA can be reduced by some modulation technologies or time-frequency domain precoding technologies. The FMDA technology based on GMSK modulation and the SC-OFDMA technology have their respective applications due to their respective advantages and disadvantages. For example, in deep coverage, uplink synchronization is inaccurate and high transmission power also requires low PAPR for a terminal, so FMDA is more applicable. In ordinary coverage, SC-OFDMA is a better choice to ensure spectral efficiency.

Uplink NB-IOT may use both the FMDA technology based on GMSK modulation and the SC-OFDMA technology. In addition, in future 5G wireless communication systems, one radio access technology (RAT) cannot meet diversified requirements and one system may use multiple RATs, for example, the orthogonal multiple access technology and the non-orthogonal multiple access technology, simultaneously.

No efficient solution has been provided to solve the problem in merging different radio access technologies in the related art.

SUMMARY

The present disclosure provides a data processing method based on a radio access technology, and a transmission node to solve at least the problem in the related art.

In one aspect of the present disclosure, a data processing method based on a radio access technology is provided. The method includes:

selecting, by a first transmission node, a radio access technology (RAT) according to a specific rule, where the specific rule includes selecting the RAT according to at least one of the following: a coverage level, a frequency domain bandwidth, a resource unit type, a transmission mode, a pre-configuration of a first node, and a second transmission node capability; the RAT includes at least one of the following: a multiple access mode, a modulation mode, a sub-carrier spacing, and a maximum number of carriers used for carrying data; and the second transmission node capability is defined according to an RAT supported by a second transmission node, and the number of carriers used for carrying data may be a maximum number of carriers used for carrying data in frequency domain in an SC-OFDM mode, which may be a single carrier or multiple carriers; and receiving or sending, by the first transmission node, data on a radio resource unit corresponding to the selected RAT according to the selected RAT.

In an exemplary embodiment, different radio resource units correspond to different RATs.

In an exemplary embodiment, the radio resource unit is a time domain resource unit or a frequency domain resource unit.

In an exemplary embodiment, the radio resource unit includes at least a first resource unit and a second resource unit.

In an exemplary embodiment, in a case that the resource unit is a time domain resource unit, the first resource unit and the second resource unit satisfy one of the following relationships in terms of resource locations:

the first resource unit, a third resource unit and the second resource unit are arranged in sequence of incremental resource index numbers;

the second resource unit, a fourth resource unit and the first resource unit are arranged in sequence of incremental resource index numbers; and at least one child resource unit in the third resource unit and the fourth resource unit does not receive data, or at least one of the third resource unit and the fourth resource unit is a special subframe, where a resource size of the child resource unit is smaller than a resource size of the radio resource unit.

In an exemplary embodiment, a resource length of the third resource unit and a resource length of the fourth resource unit satisfy one of the following:

the resource length of the third resource unit is not equal to the resource length of the fourth resource unit;

the resource length of the third resource unit is equal to the resource length of the fourth resource unit;

at least one of the resource length of the third resource unit and the resource length of the fourth resource unit is 0;

the resource length of the third resource unit and the resource length of the fourth resource unit are determined according to the second resource unit and the first resource unit respectively, or the resource length of the third resource unit and the resource length of the fourth resource unit are determined according to an RAT corresponding to the second resource unit and an RAT corresponding to the first resource unit respectively;

the resource length of the third resource unit and the resource length of the fourth resource unit are determined according to the first resource unit and the second resource unit respectively, or the resource length of the third resource unit and the resource length of the fourth resource unit are determined according to the RAT corresponding to the first resource unit and the RAT corresponding to the second resource unit respectively; and the resource length of the third resource unit and the resource length of the fourth resource unit are configured through signaling.

In an exemplary embodiment, a resource length of the first resource unit, a resource length of the second resource unit, a resource length of the third resource unit and a resource length of the fourth resource unit satisfy one of the following:

at least one of the resource length of the first resource unit, the resource length of the second resource unit, the resource length of the third resource unit and the resource length of the fourth resource unit is an integral multiple of a first basic length unit;

a sum of two of the resource length of the first resource unit, the resource length of the second resource unit and the resource length of the third resource unit is an integral multiple of a second basic length unit;

a sum of two of the resource length of the first resource unit, the resource length of the second resource unit and the resource length of the fourth resource unit is an integral multiple of the second basic length unit;

a sum of three of the resource length of the first resource unit, the resource length of the second resource unit, the resource length of the third resource unit and the resource length of the fourth resource unit is an integral multiple of a third basic length unit;

the resource length of the third resource unit and the resource length of the first resource unit satisfy a specified ratio, or the resource length of the third resource unit and the resource length of the second resource unit satisfy a specified ratio; and the resource length of the fourth resource unit and the resource length of the first resource unit satisfy a specified ratio, or the resource length of the fourth resource unit and the resource length of the second resource unit satisfy a specified ratio.

In an exemplary embodiment, selecting, by the first transmission node, the RAT according to the coverage level includes:

selecting a first RAT when the coverage level is a level A and selecting a second RAT when the coverage level is a level B, where each of the level A and the level B corresponds to a specified coverage area.

In an exemplary embodiment, selecting, by the first transmission node, the RAT according to the frequency domain bandwidth includes:

in a case that the resource unit is a frequency domain resource unit, selecting a third RAT when the frequency domain bandwidth f satisfies f<F1 and selecting a fourth RAT when the frequency domain bandwidth f satisfies f>F2, where F1 and F2 are both real numbers greater than 0 and F2≥F1.

In an exemplary embodiment, selecting, by the first transmission node, the RAT according to the resource unit type includes:

selecting a fifth RAT when the resource unit type is a first resource unit and selecting a sixth RAT when the resource unit type is a second resource unit.

In an exemplary embodiment, in a case that the resource unit is a frequency domain resource unit, a first resource unit and a second resource unit satisfy one of the following relationships:

the first resource unit is located at both sides of the second resource unit in frequency domain; and the second resource unit is located at both sides of the first resource unit in frequency domain.

In an exemplary embodiment, in a case that the resource unit is a frequency domain resource unit, a first resource unit and a second resource unit satisfy one of the following relationships in time domain:

a length of the first resource unit is S1/S2 times of a length of the second resource unit; and a length of the second resource unit is S1/S2 times of a length of the first resource unit.

S1 and S2 are integers greater than 0.

In an exemplary embodiment, the method includes at least one of the following:

distinguishing the second transmission node capability according to the resource unit type, and receiving data according to the second transmission node capability; and determining the resource unit type according to the second transmission node capability, and sending configuration information to the second transmission node on the radio resource unit, where the configuration information is used for configuration of a data transmission of the second transmission node.

In an exemplary embodiment, the first transmission node further distinguishes the second transmission node capability according to the resource unit type, and receives data according to the second transmission node capability; and determines the resource unit type according to the second transmission node capability, and sends configuration information to the second transmission node on the resource unit. The configuration information is used for configuration of a data transmission of the second transmission node. The configuration information may be used for specifying a resource location where the second transmission node transmits data, RAT and processing modes for other data.

In another aspect of the present disclosure, a data processing method based on a radio access technology is provided. The method includes:

selecting, by a second transmission node, a radio access technology (RAT) according to a specific rule, where the specific rule includes selecting the RAT according to at least one of the following: a coverage level, a frequency domain bandwidth, a resource unit type, a transmission mode, a configuration of a first node, a measurement of a second node, and a second transmission node capability; the RAT includes at least one of the following: a multiple access mode, a modulation mode, a sub-carrier spacing, and a maximum number of carriers used for carrying data; and the second transmission node capability is defined according to an RAT supported by the second transmission node; and sending or receiving, by the second transmission node, data on a radio resource unit corresponding to the selected RAT according to the selected RAT.

In an exemplary embodiment, the radio resource unit is a time domain resource unit or a frequency domain resource unit.

In an exemplary embodiment, the radio resource unit includes at least a first resource unit and a second resource unit.

In an exemplary embodiment, in a case that the resource unit is a time domain resource unit, the first resource unit and the second resource unit satisfy one of the following relationships in terms of resource locations:

the first resource unit, a third resource unit and the second resource unit are arranged in sequence of incremental resource index numbers;

the second resource unit, a fourth resource unit and the first resource unit are arranged in sequence of incremental resource index numbers; and at least one child resource unit in the third resource unit and the fourth resource unit does not send data, or at least one of the third resource unit and the fourth resource unit is a special subframe, where a resource size of the child resource unit is smaller than a resource size of the radio resource unit.

In an exemplary embodiment, a resource length of the third resource unit and a resource length of the fourth resource unit satisfy one of the following:

the resource length of the third resource unit is not equal to the resource length of the fourth resource unit;

the resource length of the third resource unit is equal to the resource length of the fourth resource unit;

at least one of the resource length of the third resource unit and the resource length of the fourth resource unit is 0;

the resource length of the third resource unit and the resource length of the fourth resource unit are determined according to the second resource unit and the first resource unit respectively, or the resource length of the third resource unit and the resource length of the fourth resource unit are determined according to an RAT corresponding to the second resource unit and an RAT corresponding to the first resource unit respectively;

the resource length of the third resource unit and the resource length of the fourth resource unit are determined according to the first resource unit and the second resource unit respectively, or the resource length of the third resource unit and the resource length of the fourth resource unit are determined according to the RAT corresponding to the first resource unit and the RAT corresponding to the second resource unit respectively; and the resource length of the third resource unit and the resource length of the fourth resource unit are configured through signaling.

In an exemplary embodiment, a resource length of the first resource unit, a resource length of the second resource unit, a resource length of the third resource unit and a resource length of the fourth resource unit satisfy one of the following:

at least one of the resource length of the first resource unit, the resource length of the second resource unit, the resource length of the third resource unit and the resource length of the fourth resource unit is an integral multiple of a first basic length unit;

a sum of two of the resource length of the first resource unit, the resource length of the second resource unit and the resource length of the third resource unit is an integral multiple of a second basic length unit;

a sum of two of the resource length of the first resource unit, the resource length of the second resource unit and the resource length of the fourth resource unit is an integral multiple of the second basic length unit;

a sum of three of the resource length of the first resource unit, the resource length of the second resource unit, the resource length of the third resource unit and the resource length of the fourth resource unit is an integral multiple of a third basic length unit;

the resource length of the third resource unit and the resource length of the first resource unit satisfy a specified ratio, or the resource length of the third resource unit and the resource length of the second resource unit satisfy a specified ratio; and the resource length of the fourth resource unit and the resource length of the first resource unit satisfy a specified ratio, or the resource length of the fourth resource unit and the resource length of the second resource unit satisfy a specified ratio.

In an exemplary embodiment, selecting, by the second transmission node, the RAT according to the coverage level includes:

selecting a first RAT when the coverage level is a level A and selecting a second RAT when the coverage level is a level B, where each of the level A and the level B corresponds to a specified coverage area.

In an exemplary embodiment, selecting, by the second transmission node, the RAT according to the frequency domain bandwidth includes:

in a case that the resource unit is a frequency domain resource unit, selecting a third RAT when the frequency domain bandwidth f satisfies $f<F1$ and selecting a fourth RAT when the frequency domain bandwidth f satisfies $f>F2$, where F1 and F2 are both real numbers greater than 0 and $F2 \geq F1$.

In an exemplary embodiment, selecting, by the second transmission node, the RAT according to the resource unit type includes:

selecting a fifth RAT when the resource unit type is a first resource unit and selecting a sixth RAT when the resource unit type is a second resource unit.

In an exemplary embodiment, in a case that the resource unit is a frequency domain resource unit, a first resource unit and a second resource unit satisfy one of the following relationships:

the first resource unit is located at both sides of the second resource unit in frequency domain; and the second resource unit is located at both sides of the first resource unit in frequency domain.

In an exemplary embodiment, in a case that the resource unit is a frequency domain resource unit, a first resource unit and a second resource unit satisfy one of the following relationships in time domain:

a length of the first resource unit is S1/S2 times of a length of the second resource unit; and a length of the second resource unit is S1/S2 times of a length of the first resource unit.

S1 and S2 are integers greater than 0.

In an exemplary embodiment, selecting, by the second transmission node, the RAT according to the specific rule includes at least one of the following:

when a radio resource control (RRC) connection of the second transmission node has not been established, selecting the RAT according to a measurement or according to configuration information sent by a first transmission node; and when the RRC connection of the second transmission node has been established, selecting the RAT according to the configuration information sent by the first transmission node.

In an exemplary embodiment, the second transmission node further selects the resource unit type according to the second transmission node capability and sends data on the radio resource unit; and the second transmission node receives configuration information sent by a first transmission node and performs an uplink data transmission according to the configuration information.

In another aspect of the present disclosure, a transmission node is provided. The transmission node includes:

a first selection module, which is configured to select a radio access technology (RAT) according to a specific rule, where the specific rule includes selecting the RAT according to at least one of the following: a coverage level, a frequency domain bandwidth, a resource unit type, a transmission mode, a pre-configuration of a first node, and a second transmission node capability; the RAT includes at least one of the following: a multiple access mode, a modulation mode, a sub-carrier spacing, and a maximum number of carriers used for carrying data; and the second transmission node capability is defined according to an RAT supported by a second transmission node; and a processing module, which is configured to receive or send data on a radio resource unit corresponding to the selected RAT according to the selected RAT.

In another aspect of the present disclosure, a transmission node is provided. The transmission node includes:

a second selection module, which is configured to select a radio access technology (RAT) according to a specific rule, where the specific rule includes selecting the RAT according to at least one of the following: a coverage level, a frequency domain bandwidth, a resource unit type, a transmission mode, a configuration of a first node, a measurement of a second node, and a second transmission node capability; the RAT includes at least one of the following: a multiple access mode, a modulation mode, a sub-carrier spacing, and a maximum number of carriers used for carrying data; and the second transmission node capability is defined according to an RAT supported by a second transmission node; and a sending module, which is configured to send or receive data on a radio resource unit corresponding to the selected RAT according to the selected RAT.

Another embodiment of the present disclosure provides a computer storage medium, which is configured to store execution instructions for executing one of or a combination of the steps of methods in the above method embodiments.

Through the present disclosure, a first transmission node selects a radio access technology (RAT) according to a specific rule, where the specific rule includes selecting the RAT according to at least one of the following: a coverage level, a frequency domain bandwidth, a resource unit type, a transmission mode, a pre-configuration of a first node, and a second transmission node capability; the RAT includes at least one of the following: a multiple access mode, a modulation mode, a sub-carrier spacing, and a maximum number of carriers used for carrying data; and the second transmission node capability is defined according to an RAT supported by a second transmission node; and the first transmission node receives or sends data on a radio resource unit corresponding to the selected RAT according to the selected RAT. This solution solves the problem in merging different radio access technologies, satisfies different design requirements and is compatible with different radio access technologies.

BRIEF DESCRIPTION OF DRAWINGS

The accompanying drawings described herein are used to provide a further understanding of the present disclosure, and form a part of the present application. The exemplary embodiments and descriptions thereof in the present disclosure are used to explain the present disclosure and do not limit the present disclosure in an improper way. In the accompanying drawings.

DETAILED DESCRIPTION

The present disclosure will be detailed below with reference to the accompanying drawings in conjunction with the embodiments. If not in collision, the embodiments described herein and the features thereof may be combined with each other.

It is to be noted that the terms "first", "second" and the like in the description, claims and drawings of the present disclosure are used to distinguish between similar objects and are not necessarily used to describe a particular order or sequence.

Figure 1:
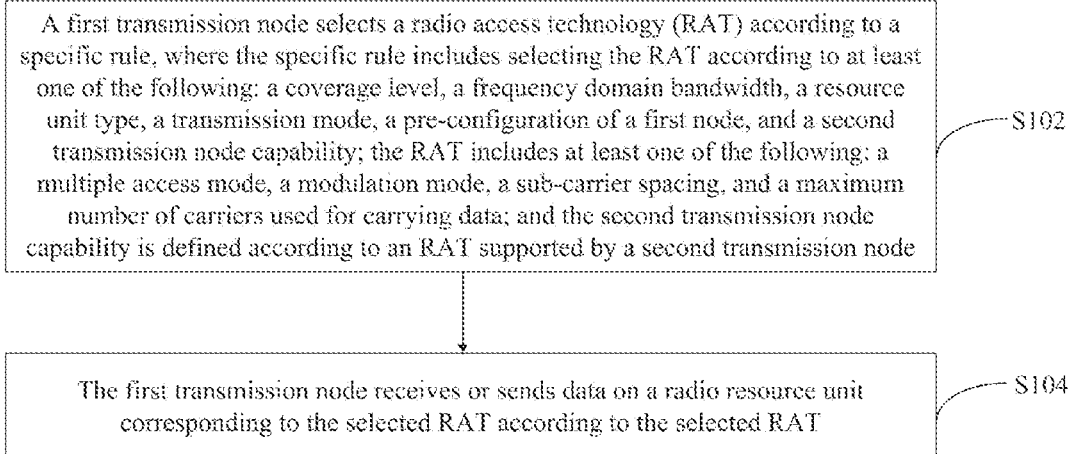
FIG. 1 is a first flowchart of a data processing method based on a radio access technology according to an embodiment of the present disclosure.

An embodiment provides a data processing method based on a radio access technology. FIG. 1 is a first flowchart of a data processing method based on a radio access technology according to an embodiment of the present disclosure. As shown in FIG. 1, the method includes the steps described below.

In step S102, a first transmission node selects a radio access technology (RAT) according to a specific rule, where the specific rule includes selecting the RAT according to at least one of the following: a coverage level, a frequency domain bandwidth, a resource unit type, a transmission mode, a pre-configuration of a first node, and a second transmission node capability; the RAT includes at least one of the following: a multiple access mode, a modulation mode, a sub-carrier spacing, and a maximum number of carriers used for carrying data; and the second transmission node capability is defined according to an RAT supported by a second transmission node.

In step S104, the first transmission node receives or sends data on a radio resource unit corresponding to the selected RAT according to the selected RAT.

Through this method, a first transmission node selects a radio access technology (RAT) according to a specific rule, where the specific rule includes selecting the RAT according to at least one of the following: a coverage level, a frequency domain bandwidth, a resource unit type, a transmission mode, a pre-configuration of a first node, and a second transmission node capability; the RAT includes at least one of the following: a multiple access mode, a modulation mode, a sub-carrier spacing, and a maximum number of carriers used for carrying data; the second transmission node capability is defined according to an RAT supported by a second transmission node; and the first transmission node receives or sends data on a radio resource unit corresponding to the selected RAT according to the selected RAT. This method solves the problem in merging different radio access technologies, satisfies different design requirements and is compatible with different radio access technologies.

In an embodiment, a number of carriers used for carrying data may be a maximum number of carriers used for carrying data in frequency domain in an SC-OFDM mode, which may be a single carrier or multiple carriers.

In an embodiment, the radio resource unit is a time domain resource unit or a frequency domain resource unit.

In an embodiment, the radio resource unit includes at least a first resource unit and a second resource unit.

In an embodiment, in a case that the resource unit is a time domain resource unit, the first resource unit and the second resource unit satisfy one of the following relationships in terms of resource locations:

the first resource unit, a third resource unit and the second resource unit are arranged in sequence of incremental resource index numbers;

the second resource unit, a fourth resource unit and the first resource unit are arranged in sequence of incremental resource index numbers; and at least one child resource unit in the third resource unit and the fourth resource unit does not receive data, or at least one of the third resource unit and the fourth resource unit is a special subframe, and a resource size of the child resource unit is smaller than a resource size of the radio resource unit.

In an embodiment, a resource length of the third resource unit and a resource length of the fourth resource unit satisfy one of the following:

the resource length of the third resource unit is not equal to the resource length of the fourth resource unit;

the resource length of the third resource unit is equal to the resource length of the fourth resource unit;

at least one of the resource length of the third resource unit and the resource length of the fourth resource unit is 0;

the resource length of the third resource unit and the resource length of the fourth resource unit are determined according to the second resource unit and the first resource unit respectively, or the resource length of the third resource unit and the resource length of the fourth resource unit are determined according to an RAT corresponding to the second resource unit and an RAT corresponding to the first resource unit respectively;

the resource length of the third resource unit and the resource length of the fourth resource unit are determined according to the first resource unit and the second resource unit respectively, or the resource length of the third resource unit and the resource length of the fourth resource unit are determined according to the RAT corresponding to the first resource unit and the RAT corresponding to the second resource unit respectively; and the resource length of the third resource unit and the resource length of the fourth resource unit are configured through signaling.

In an embodiment, a resource length of the first resource unit, a resource length of the second resource unit, a resource length of the third resource unit and a resource length of the fourth resource unit satisfy one of the following:

at least one of the resource length of the first resource unit, the resource length of the second resource unit, the resource length of the third resource unit and the resource length of the fourth resource unit is an integral multiple of a first basic length unit;

a sum of two of the resource length of the first resource unit, the resource length of the second resource unit and the resource length of the third resource unit is an integral multiple of a second basic length unit;

a sum of two of the resource length of the first resource unit, the resource length of the second resource unit and the resource length of the fourth resource unit is an integral multiple of the second basic length unit;

a sum of three of the resource length of the first resource unit, the resource length of the second resource unit, the resource length of the third resource unit and the resource length of the fourth resource unit is an integral multiple of a third basic length unit;

the resource length of the third resource unit and the resource length of the first resource unit satisfy a specified ratio, or the resource length of the third resource unit and the resource length of the second resource unit satisfy a specified ratio; and the resource length of the fourth resource unit and the resource length of the first resource unit satisfy a specified ratio, or the resource length of the fourth resource unit and the resource length of the second resource unit satisfy a specified ratio.

In an embodiment, selecting, by the first transmission node, the RAT according to the coverage level includes:

selecting a first RAT when the coverage level is a level A and selecting a second RAT when the coverage level is a level B, where each of the level A and the level B corresponds to a specified coverage area.

In an embodiment, selecting, by the first transmission node, the RAT according to the frequency domain bandwidth includes:

in a case that the resource unit is a frequency domain resource unit, selecting a third RAT when the frequency domain bandwidth f satisfies f<F1 and selecting a fourth RAT when the frequency domain bandwidth f satisfies f>F2, where F1 and F2 are both real numbers greater than 0 and F2≥F1.

In an embodiment, selecting, by the first transmission node, the RAT according to the resource unit type includes:

selecting a fifth RAT when the resource unit type is the first resource unit and selecting a sixth RAT when the resource unit type is the second resource unit.

In an embodiment, in a case that the resource unit is a frequency domain resource unit, the first resource unit and the second resource unit satisfy one of the following relationships:

the first resource unit is located at both sides of the second resource unit in frequency domain; and the second resource unit is located at both sides of the first resource unit in frequency domain.

In an embodiment, in a case that the resource unit is a frequency domain resource unit, the first resource unit and the second resource unit satisfy one of the following relationships in time domain:

a length of the first resource unit is S1/S2 times of a length of the second resource unit; and a length of the second resource unit is S1/S2 times of a length of the first resource unit.

S1 and S2 are integers greater than 0.

In an embodiment, the first transmission node further distinguishes the second transmission node capability according to the resource unit type, and receives data according to the second transmission node capability; and determines the resource unit type according to the second transmission node capability, and sends configuration information to the second transmission node on the resource unit. The configuration information is used for configuration of a data transmission of the second transmission node.

Figure 2:
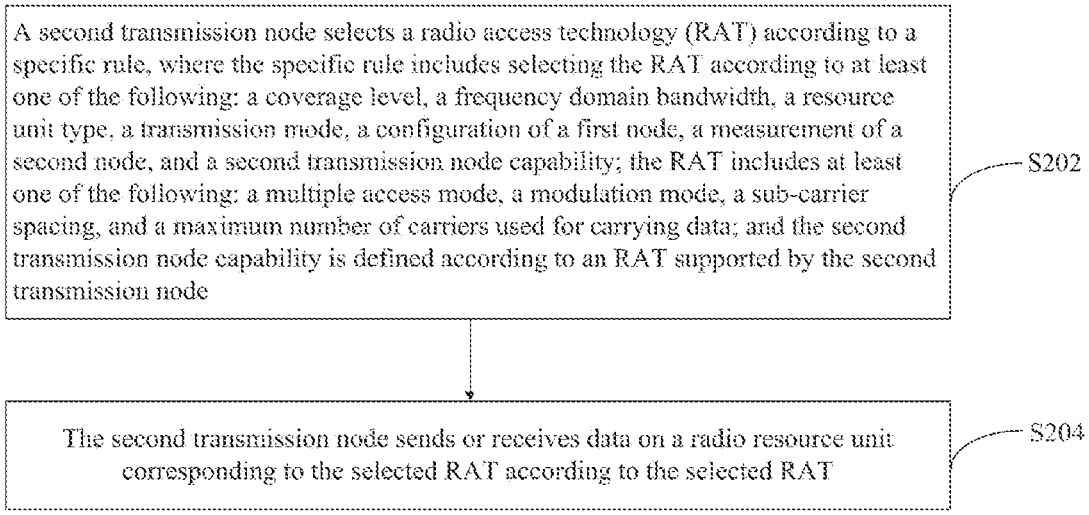
FIG. 2 is a second flowchart of a data processing method based on a radio access technology according to an embodiment of the present disclosure.

An embodiment provides a data processing method based on a radio access technology. FIG. 2 is a second flowchart of a data processing method based on a radio access technology according to an embodiment of the present disclosure. As shown in FIG. 2, the method includes the steps described below.

In step S202, a second transmission node selects a radio access technology (RAT) according to a specific rule, where the specific rule includes selecting the RAT according to at least one of the following: a coverage level, a frequency domain bandwidth, a resource unit type, a transmission mode, a configuration of a first node, a measurement of a second node, and a second transmission node capability; the RAT includes at least one of the following: a multiple access mode, a modulation mode, a sub-carrier spacing, and a maximum number of carriers used for carrying data; and the second transmission node capability is defined according to an RAT supported by the second transmission node.

In step S204, the second transmission node sends or receives data on a radio resource unit corresponding to the selected RAT according to the selected RAT.

Through these steps, a second transmission node selects a radio access technology (RAT) according to a specific rule, where the specific rule includes selecting the RAT according to at least one of the following: a coverage level, a frequency domain bandwidth, a resource unit type, a transmission mode, a configuration of a first node, a measurement of a second node, and a second transmission node capability; the RAT includes at least one of the following: a multiple access mode, a modulation mode, a sub-carrier spacing, and a maximum number of carriers used for carrying data; the second transmission node capability is defined according to an RAT supported by the second transmission node; and the second transmission node sends or receives data on a radio resource unit corresponding to the selected RAT according to the selected RAT. This method solves the problem in merging different radio access technologies, satisfies different design requirements and is compatible with different radio access technologies.

In an embodiment, the radio resource unit is a time domain resource unit or a frequency domain resource unit.

In an embodiment, the radio resource unit includes at least a first resource unit and a second resource unit.

In an embodiment, in a case that the resource unit is a time domain resource unit, the first resource unit and the second resource unit satisfy one of the following relationships in terms of resource locations:

the first resource unit, a third resource unit and the second resource unit are arranged in sequence of incremental resource index numbers;

the second resource unit, a fourth resource unit and the first resource unit are arranged in sequence of incremental resource index numbers; and at least one child resource unit in the third resource unit and the fourth resource unit does not send data, or at least one of the third resource unit and the fourth resource unit is a special subframe, and a resource size of the child resource unit is smaller than a resource size of the radio resource unit.

In an embodiment, a resource length of the third resource unit and a resource length of the fourth resource unit satisfy one of the following:

the resource length of the third resource unit is not equal to the resource length of the fourth resource unit;

the resource length of the third resource unit is equal to the resource length of the fourth resource unit;

at least one of the resource length of the third resource unit and the resource length of the fourth resource unit is 0;

the resource length of the third resource unit and the resource length of the fourth resource unit are determined according to the second resource unit and the first resource unit respectively, or the resource length of the third resource unit and the resource length of the fourth resource unit are determined according to an RAT corresponding to the second resource unit and an RAT corresponding to the first resource unit respectively;

the resource length of the third resource unit and the resource length of the fourth resource unit are determined according to the first resource unit and the second resource unit respectively, or the resource length of the third resource unit and the resource length of the fourth resource unit are determined according to the RAT corresponding to the first resource unit and the RAT corresponding to the second resource unit respectively; and the resource length of the third resource unit and the resource length of the fourth resource unit are configured through signaling.

In an exemplary embodiment, a resource length of the first resource unit, a resource length of the second resource unit, a resource length of the third resource unit and a resource length of the fourth resource unit satisfy one of the following:

at least one of the resource length of the first resource unit, the resource length of the second resource unit, the resource length of the third resource unit and the resource length of the fourth resource unit is an integral multiple of a first basic length unit;

a sum of two of the resource length of the first resource unit, the resource length of the second resource unit and the resource length of the third resource unit is an integral multiple of a second basic length unit;

a sum of two of the resource length of the first resource unit, the resource length of the second resource unit and the resource length of the fourth resource unit is an integral multiple of the second basic length unit;

a sum of three of the resource length of the first resource unit, the resource length of the second resource unit, the resource length of the third resource unit and the resource length of the fourth resource unit is an integral multiple of a third basic length unit;

the resource length of the third resource unit and the resource length of the first resource unit satisfy a specified ratio, or the resource length of the third resource unit and the resource length of the second resource unit satisfy a specified ratio; and the resource length of the fourth resource unit and the resource length of the first resource unit satisfy a specified ratio, or the resource length of the fourth resource unit and the resource length of the second resource unit satisfy a specified ratio.

In an embodiment, selecting, by the second transmission node, the RAT according to the coverage level includes:

selecting a first RAT when the coverage level is a level A and selecting a second RAT when the coverage level is a level B, where each of the level A and the level B corresponds to a specified coverage area.

In an embodiment, selecting, by the second transmission node, the RAT according to the frequency domain bandwidth includes:

in a case that the resource unit is a frequency domain resource unit, selecting a third RAT when the frequency domain bandwidth f satisfies f<F1 and selecting a fourth RAT when the frequency domain bandwidth f satisfies f>F2, where F1 and F2 are both real numbers greater than 0 and F2≥F1.

In an embodiment, selecting, by the second transmission node, the RAT according to the resource unit type includes:

selecting a fifth RAT when the resource unit type is the first resource unit and selecting a sixth RAT when the resource unit type is the second resource unit.

In an embodiment, in a case that the resource unit is a frequency domain resource unit, the first resource unit and the second resource unit satisfy one of the following relationships:

the first resource unit is located at both sides of the second resource unit in frequency domain; and the second resource unit is located at both sides of the first resource unit in frequency domain.

In an embodiment, in a case that the resource unit is a frequency domain resource unit, the first resource unit and the second resource unit satisfy one of the following relationships in time domain:

a length of the first resource unit is S1/S2 times of a length of the second resource unit; and a length of the second resource unit is S1/S2 times of a length of the first resource unit. S1 and S2 are integers greater than 0.

In an embodiment, selecting, by the second transmission node, the RAT according to the specific rule includes at least one of the following:

when a radio resource control (RRC) connection of the second transmission node has not been established, selecting the RAT according to a measurement or according to configuration information sent by a first transmission node; and when the RRC connection of the second transmission node has been established, selecting the RAT according to the configuration information sent by the first transmission node.

In an embodiment, the second transmission node further selects the resource unit type according to the second transmission node capability and sends data on the resource unit; and the second transmission node receives configuration information sent by a first transmission node and performs an uplink data transmission according to the configuration information.

An embodiment provides a transmission node. The node is used for implementing the above-mentioned embodiments and preferred implementations. What has been described will not be repeated. As used below, the term "module" may be software, hardware or a combination thereof capable of implementing preset functions. The apparatuses in the embodiments described below are preferably implemented by software, but implementation by hardware or by a combination of software and hardware is also possible and conceived.

Figure 3:
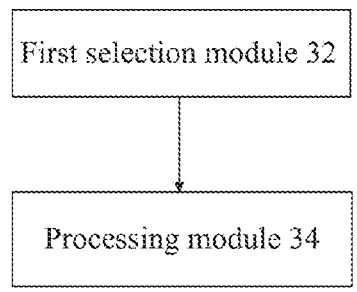
FIG. 3 is a first block diagram of a transmission node according to an embodiment of the present disclosure.

FIG. 3 is a first block diagram of a transmission node according to an embodiment of the present disclosure. As shown in FIG. 3, the node may be a terminal or a base station. The node includes:

a first selection module 32, which is configured to select a radio access technology (RAT) according to a specific rule, where the specific rule includes selecting the RAT according to at least one of the following: a coverage level, a frequency domain bandwidth, a resource unit type, a transmission mode, a pre-configuration of a first node, and a second transmission node capability; the RAT includes at least one of the following: a multiple access mode, a modulation mode, a sub-carrier spacing, and a maximum number of carriers used for carrying data; and the second transmission node capability is defined according to an RAT supported by a second transmission node; and a processing module 34, which is configured to receive or send data on a radio resource unit corresponding to the selected RAT according to the selected RAT.

Figure 4:
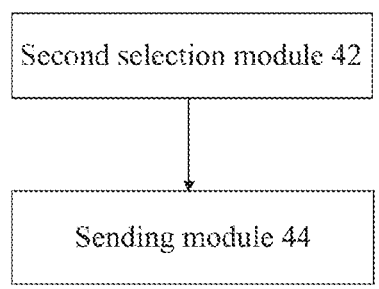
FIG. 4 is a second block diagram of a transmission node according to an embodiment of the present disclosure.

FIG. 4 is a second block diagram of a transmission node according to an embodiment of the present disclosure. As shown in FIG. 4, the node may be a terminal or a base station. The node includes:

a second selection module 42, which is configured to select a radio access technology (RAT) according to a specific rule, where the specific rule includes selecting the RAT according to at least one of the following: a coverage level, a frequency domain bandwidth, a resource unit type, a transmission mode, a configuration of a first node, a measurement of a second node, and a second transmission node capability; the RAT includes at least one of the following: a multiple access mode, a modulation mode, a sub-carrier spacing, and a maximum number of carriers used for carrying data; and the second transmission node capability is defined according to an RAT supported by a second transmission node; and a sending module 44, which is configured to send or receive data on a radio resource unit corresponding to the selected RAT according to the selected RAT.

The present disclosure will be detailed below in conjunction with preferred embodiments and implementations.

In all preferred embodiments described below, it is assumed that the first transmission node is a base station and the second transmission node is a terminal. Of course, alternatively, the first transmission node may be a terminal and the second transmission node may be a base station.

Preferred Embodiment 1 Includes Three Implementations

Figure 5:
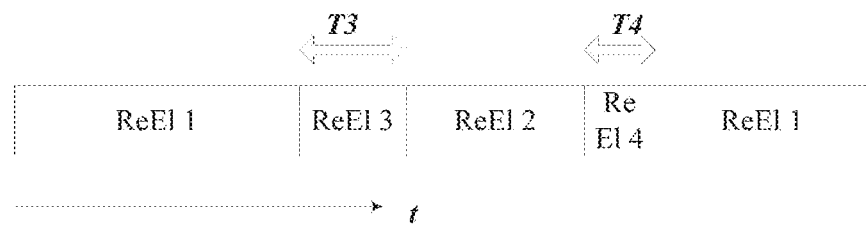
FIG. 5 is first a schematic diagram of a timing relationship of a base station according to a preferred embodiment of the present disclosure.

Implementation 1.1:

This implementation assumes an uplink LTE-IOT transmission. FIG. 5 is a first schematic diagram of a timing relationship of a base station according to a preferred embodiment of the present disclosure. As shown in FIG. 5, a number of time domain resources are arranged in sequence of a first resource unit ReEl 1, a third resource unit ReEl 3, a second resource unit ReEl 2, a fourth resource unit ReEl 4 and a first resource unit ReEl 1 as time increases. The base station receives and processes data on ReEl 1 and ReEl 2 by using the FDMA mode and the SC-OFDMA mode respectively. ReEl 3 and ReEl 4 are guard intervals. A time length of ReEl 3 and a time length of ReEl 4 are T3 and T4 respectively. The guard intervals are mainly designed for a switching delay when the base station switches between different multiple access modes and for a timing requirement of an uplink transmission. T3 is larger than T4 in this implementation because switching delay and timing are both taken into account for T3 whereas only switching delay is taken into account for T4. Unequal guard intervals may allow more time domain resources to be reserved for a certain resource unit considering that different multiple access modes may have different transmission rates; or different guard intervals may be designed to meet different transmission timing precision requirements; or different guard intervals are required when applied to different coverage areas. To simplify the design of lengths of the guard intervals, it is feasible to specify that the time length of ReEl 3 and the time length of ReEl 4 are proportional to those of ReEl 2 and ReEl 1 respectively or it is feasible to specify that the time length of ReEl 3 and the time length of ReEl 4 are proportional to those of ReEl 1 and ReEl 2 respectively. In this implementation, FDMA has a lower spectral efficiency and requires a lower timing precision. Therefore, a smaller guard interval is designed and more time domain resources are allocated for data transmission.

Figure 6:
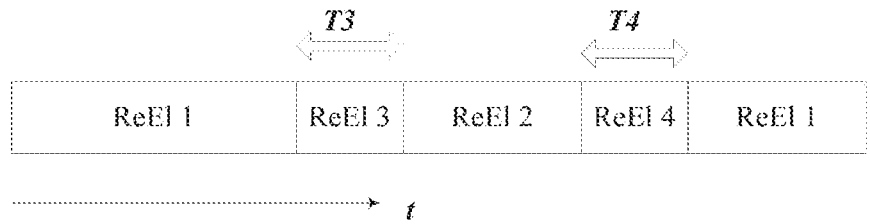
FIG. 6 is a second schematic diagram of a timing relationship of a base station according to a preferred embodiment of the present disclosure.

Implementation 1.2:

This implementation assumes a number of time domain resources. FIG. 6 is a second schematic diagram of a timing relationship of a base station according to a preferred embodiment of the present disclosure. As shown in FIG. 6, a number of time domain resources are arranged in sequence of a first resource unit ReEl 1, a third resource unit ReEl 3, a second resource unit ReEl 2, a fourth resource unit ReEl 4 and a first resource unit ReEl 1 as time increases. The base station receives and processes data on ReEl 1 and ReEl 2 by using the time domain code division mode and the SC-OFDMA mode respectively. ReEl 3 and ReEl 4 are guard intervals. A time length of ReEl 3 and a time length of ReEl 4 are T3 and T4 respectively. The guard intervals are mainly designed for a switching delay between different multiple access modes and for a timing requirement. T3 is equal to T4 in this implementation. Switching delay from ReEl 1 to ReEl 2 and timing are taken into account for T3. Switching delay from ReEl 2 to ReEl 1 and timing are taken into account for T4. In this implementation, equal guard intervals are designed and equal time domain resources are reserved for two multiple access modes. To simplify the design of lengths of the guard intervals, it is feasible to specify that the time length of ReEl 3 and the time length of ReEl 4 are proportional to those of ReEl 2 and ReEl 1 respectively or it is feasible to specify that the time length of ReEl 3 and the time length of ReEl 4 are proportional to those of ReEl 1 and ReEl 2 respectively.

Figure 7:
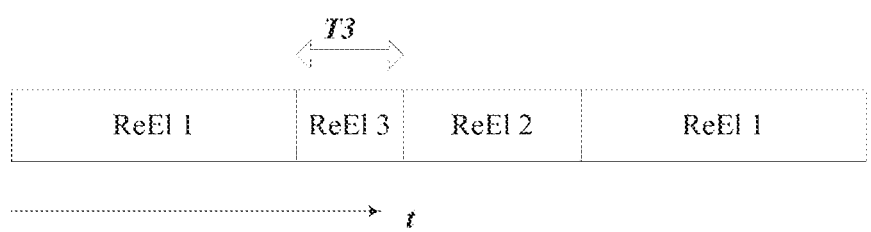
FIG. 7 is a third schematic diagram of a timing relationship of a base station according to a preferred embodiment of the present disclosure.

Implementation 1.3:

This implementation assumes an uplink LTE-IOT transmission. FIG. 7 is a third schematic diagram of a timing relationship of a base station according to a preferred embodiment of the present disclosure. As shown in FIG. 7, a number of time domain resources are arranged in sequence of a first resource unit ReEl 1, a third resource unit ReEl 3, a second resource unit ReEl 2 and a first resource unit ReEl 1 as time increases. The base station receives and processes data on ReEl 1 and ReEl 2 by using the FDMA mode and the SC-OFDMA mode respectively. ReEl 3 is a guard interval. A time length of ReEl 3 is T3. In this implementation, T4 is equal to 0 and T3 is not equal to T4. The guard interval is mainly designed for a switching delay between different multiple access modes and for a timing requirement. Unequal guard intervals may allow more time domain resources to be reserved for a certain resource unit considering that different multiple access modes may have different transmission rates; or different guard intervals may be designed to meet different transmission timing precision requirements; or different guard intervals are required when applied to different coverage areas. In this implementation, FDMA does not require a high timing precision, so it is not needed to design a guard interval in consideration for timing and it is feasible to obtain a switching interval by adjusting the time at which ReEl 2 receives data.

Figure 8:
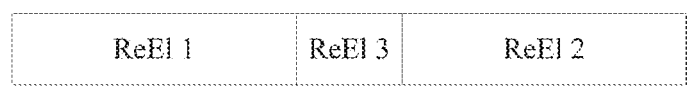
FIG. 8 is a fourth schematic diagram of a timing relationship of a base station according to a preferred embodiment of the present disclosure.
Figure 8:

Implementation 1.4:

This implementation assumes an uplink LTE-IOT transmission. FIG. 8 is a fourth schematic diagram of a timing relationship of a base station according to a preferred embodiment of the present disclosure. As shown in FIG. 8, a number of time domain resources are arranged in sequence of a first resource unit ReEl 1, a third resource unit ReEl 3 and a second resource unit ReEl 2 as time increases. The base station receives and processes data on ReEl 1 and ReEl 2 by using the SC-OFDMA mode and the FDMA mode respectively. A time length of ReEl 3 depends on two factors. One is T1, which is a sum of a switching delay when the base station switches between different multiple access modes and a maximum timing advance. The other is T2, which is an uplink timing error. In this implementation, uplink synchronization of a terminal is not performed or uplink synchronization is not accurate, so a guard interval is reserved. Of course, the base station may receive data after the switching delay T1. The time length of ReEl 3 may be an integral multiple of a specified time unit. T1 may be in a fixed proportion to T2.

Preferred Embodiment 2 Includes Five Implementations

Figure 9:
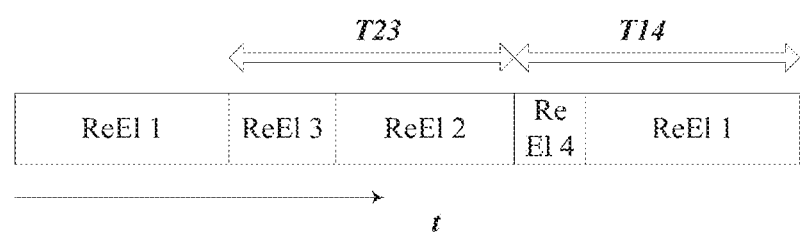
FIG. 9 is a fifth schematic diagram of a timing relationship of a base station according to a preferred embodiment of the present disclosure.

Implementation 2.1:

In this implementation, FIG. 9 is a fifth schematic diagram of a timing relationship of a base station according to a preferred embodiment of the present disclosure. As shown in FIG. 9, it is assumed that a number of time domain resources are arranged in sequence of a first resource unit ReEl 1, a third resource unit ReEl 3, a second resource unit ReEl 2, a fourth resource unit ReEl 4 and a first resource unit ReEl 1 as time increases. The base station receives and processes data on ReEl 1 and ReEl 2 by using different multiple access modes or different modulation modes. T23, which is a sum of time lengths of ReEl 3 and ReEl 2, and T14, which is a sum of time lengths of ReEl 4 and ReEl 1, satisfy: T14=T23=T0, where T0 is a time length unit. The time length unit in this implementation is N subframes, where the number of subframes of one radio frame can be exactly divided by N. This design is conducive to the compatibility of two RATs, makes the frame structure simpler and clearer, and simplifies the timing relationship, including HARQ and retransmission timing.

Figure 10:
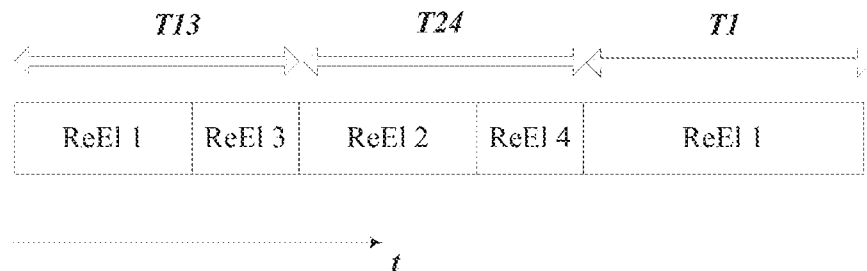
FIG. 10 is a sixth schematic diagram of a timing relationship of a base station according to a preferred embodiment of the present disclosure.

Implementation 2.2:

In this implementation, FIG. 10 is a sixth schematic diagram of a timing relationship of a base station according to a preferred embodiment of the present disclosure. As shown in FIG. 10, it is assumed that a number of time domain resources are arranged in sequence of a first resource unit ReEl 1, a third resource unit ReEl 3, a second resource unit ReEl 2, a fourth resource unit ReEl 4 and a first resource unit ReEl 1 as time increases. The base station receives and processes data on ReEl 1 and ReEl 2 by using different multiple access modes or different modulation modes. T13, which is a sum of time lengths of ReEl 1 and ReEl 3, and T24, which is a sum of time lengths of ReEl 2 and ReEl 4, satisfy: T13=T24=T0, where T0 is a time length unit. The time length unit in this implementation is N subframes, where the number of subframes of one radio frame can be exactly divided by N. This design is conducive to the compatibility of two RATs, makes the frame structure simpler and clearer, and simplifies the timing relationship, including HARQ and retransmission timing.

Figure 11:
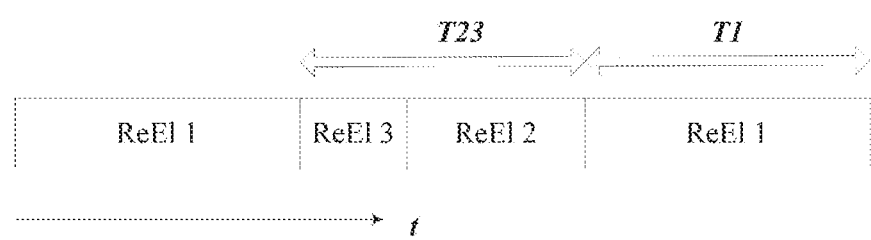
FIG. 11 is a seventh schematic diagram of a timing relationship of a base station according to a preferred embodiment of the present disclosure.

Implementation 2.3:

In this implementation, FIG. 11 is a seventh schematic diagram of a timing relationship of a base station according to a preferred embodiment of the present disclosure. As shown in FIG. 11, it is assumed that a number of time domain resources are arranged in sequence of a first resource unit ReEl 1, a third resource unit ReEl 3, a second resource unit ReEl 2 and a first resource unit ReEl 1 as time increases. The base station receives and processes data on ReEl 1 and ReEl 2 by using different multiple access modes or different modulation modes. T23, which is a sum of time lengths of ReEl 2 and ReEl 3, and T1, which is a time length of ReEl 1, satisfy: T1=T23=T0, where T0 is a time length unit. The time length unit in this implementation is N subframes, where the number of subframes of one radio frame can be exactly divided by N. This design is conducive to the compatibility of two RATs, makes the frame structure simpler and clearer, and simplifies the timing relationship, including HARQ and retransmission timing.

Figure 12:
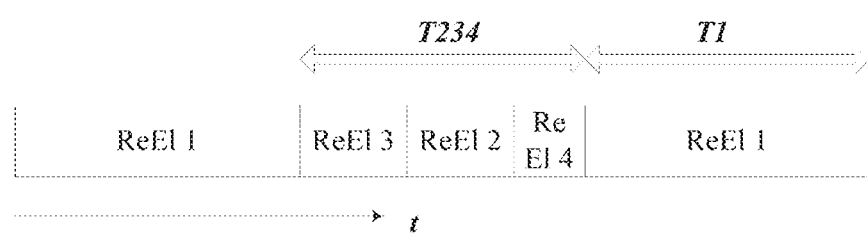
FIG. 12 is an eighth schematic diagram of a timing relationship of a base station according to a preferred embodiment of the present disclosure.

Implementation 2.4:

In this implementation, FIG. 12 is an eighth schematic diagram of a timing relationship of a base station according to a preferred embodiment of the present disclosure. As shown in FIG. 12, it is assumed that a number of time domain resources are arranged in sequence of a first resource unit ReEl 1, a third resource unit ReEl 3, a second resource unit ReEl 2, a fourth resource unit ReEl 4 and a first resource unit ReEl 1 as time increases. The base station receives and processes data on ReEl 1 and ReEl 2 by using different multiple access modes or different modulation modes. T1, which is a time length of ReEl 1, and T234, which is a sum of time lengths of ReEl 2, ReEl 3 and ReEl 4, satisfy: T1=T234=T0, where T0 is a time length unit. The time length unit in this implementation is N subframes, where the number of subframes of one radio frame can be exactly divided by N. This design is conducive to the compatibility of two RATs, makes the frame structure simpler and clearer, and simplifies the timing relationship, including HARQ and retransmission timing.

Figure 13:
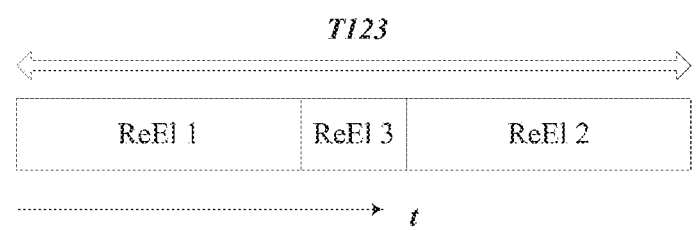
FIG. 13 is a ninth schematic diagram of a timing relationship of a base station according to a preferred embodiment of the present disclosure.

Implementation 2.5:

In this implementation, FIG. 13 is a ninth schematic diagram of a timing relationship of a base station according to a preferred embodiment of the present disclosure. As shown in FIG. 13, a number of time domain resources are arranged in sequence of a first resource unit ReEl 1, a third resource unit ReEl 3 and a second resource unit ReEl 2 as time increases. The base station receives and processes data on ReEl 1 and ReEl 2 by using different multiple access modes or different modulation modes. T123, which is a sum of time lengths of ReEl 1, ReEl 2 and ReEl 3 satisfies: T123=T0, where T0 is a time length unit. The time length unit in this implementation is N subframes, where the number of subframes of one radio frame can be exactly divided by N. This design is conducive to the compatibility of two RATs, makes the frame structure simpler and clearer, and simplifies the timing relationship, including HARQ and retransmission timing.

Preferred Embodiment 3 Includes Three Implementations

Implementation 3.1:

This implementation assumes an uplink NB-IOT transmission. A first RAT and a second RAT use the FDMA mode and the SC-OFDMA mode respectively. The FDMA uses GMSK modulation. The SC-OFDMA uses QAM modulation. Terminals are divided into low-coverage UEs, medium-coverage UEs and high-coverage UEs as the distances between the terminals and a base station increase. Medium-coverage and low-coverage UEs perform uplink transmission on a first resource unit by using SC-OFDMA. High-coverage UEs perform uplink transmission on a second resource unit by using FDMA. High-coverage UEs require higher transmit power. The FDMA mode based on GMSK modulation has a relatively low PAPR, ensuring coverage of low-cost UEs. Additionally, the FDMA mode does not require a high timing precision, reducing synchronization overheads and improving system capacity. Medium-coverage and low-coverage UEs use SC-OFDMA, so the spectral efficiency can be improved. The base station receives data on the first resource unit and the second resource unit separately. After determining coverage areas of UEs, the base station processes data by using the FDMA mode and the SC-OFDMA mode separately.

Implementation 3.2:

This implementation assumes an uplink NB-IOT transmission. A first RAT and a second RAT use the SC-OFDMA mode and the FDMA mode based on GMSK modulation respectively. This implementation assumes that when a frequency domain bandwidth is smaller than a predefined F0, a terminal performs an uplink transmission on a first resource unit by using the SC-OFDMA mode; otherwise, the terminal performs an uplink transmission on a second resource unit by using the FDMA mode based on GMSK modulation. Assuming that there are two spectrums: a spectrum A having a frequency length F1 and a spectrum B having a frequency length F2, F1<F0<F2, the SC-OFDMA mode and the FDMA mode based on GMSK modulation are used on the spectrum A and the spectrum B respectively. The spectrum A has a smaller length and SC-OFDMA mode has a higher spectral efficiency, so this spectrum can be used to achieve higher-rate data transmission. A base station receives data on the first resource unit and the second resource unit separately and processes data by using the SC-OFDMA mode and the FDMA mode separately.

Implementation 3.3:

This implementation assumes an uplink NB-IOT transmission. A first RAT and a second RAT use the SC-OFDMA mode and the FDMA mode based on GMSK modulation respectively. In this implementation, a base station configures a terminal to use the first RAT to send data on a first resource unit and use the second RAT to send data on a second resource unit. The base station receives data from the terminal on the first resource unit and processes the data by using the first RAT.

Preferred Embodiment 4

This embodiment assumes an uplink NB-IOT transmission. A first RAT and a second RAT both use the SC-OFDMA mode. A sub-carrier spacing of the first RAT and a sub-carrier spacing of the second RAT are 3.75 kHz and 15 kHz respectively. In this embodiment, a base station configures a terminal to use the first RAT to send data on a first resource unit. In frequency domain, subcarriers of the first resource unit corresponding to the first RAT are located in the center of a frequency band, and subcarriers of a second resource unit corresponding to the second RAT are distributed on both sides of the subcarriers of the first RAT and located at both sides of the frequency band. The base station receives data from the terminal on the first resource unit and processes the data by using the first RAT. Frequency domain resources of one RAT are located at both sides of frequency domain resources of another RAT, helping flexibly changing the sizes of frequency domain resources and maintaining features of a single-carrier OFDMA and thereby reducing a PAPR.

Preferred Embodiment 5

Figure 14:
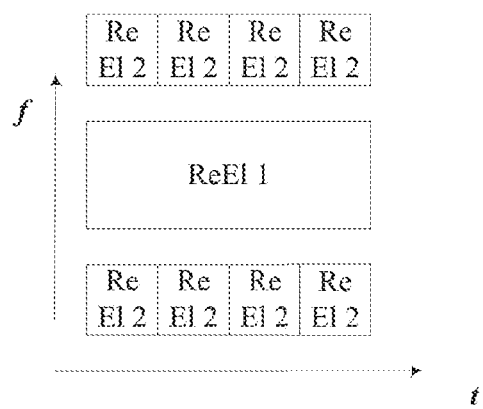
FIG. 14 is a tenth schematic diagram of a timing relationship of a base station according to a preferred embodiment of the present disclosure.

This embodiment assumes an uplink NB-IOT transmission. A first RAT and a second RAT both use the SC-OFDMA mode. A sub-carrier spacing of the first RAT and a sub-carrier spacing of the second RAT are 3.75 kHz and 15 kHz respectively. In this embodiment, FIG. 14 is a tenth schematic diagram of a timing relationship of a base station according to a preferred embodiment of the present disclosure. As shown in FIG. 14, the base station configures a terminal to use the first RAT to send data on a first resource unit. In frequency domain, subcarriers of the first resource unit corresponding to the first RAT are located in the center of a frequency band, and subcarriers of a second resource unit corresponding to the second RAT are distributed on both sides of the subcarriers of the first RAT and located at both sides of the frequency band. In time domain, a ratio of a length of the first resource unit corresponding to the first RAT to a length of the second resource unit corresponding to the second RAT is 4:1. The base station receives data from the terminal on the first resource unit and processes the data by using the first RAT. This design in time domain is conducive to the compatibility of two RATs, makes the frame structure simpler and clearer, and simplifies the timing relationship, including HARQ and retransmission timing.

Preferred Embodiment 6 Includes Five Implementations

Figure 15:
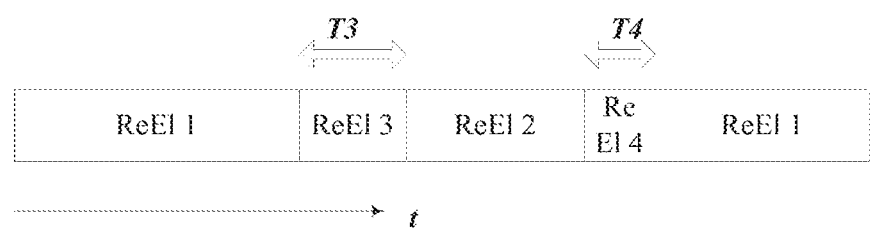
FIG. 15 is an eleventh schematic diagram of a timing relationship of a base station according to a preferred embodiment of the present disclosure.

Implementation 6.1:
This implementation assumes an uplink LTE-IOT transmission. FIG. 15 is an eleventh schematic diagram of a timing relationship of a base station according to a preferred embodiment of the present disclosure. As shown in FIG. 15, a number of time domain resources are arranged in sequence of a first resource unit ReEl 1, a third resource unit ReEl 3, a second resource unit ReEl 2, a fourth resource unit ReEl 4 and a first resource unit ReEl 1 as time increases. A terminal sends data on ReEl 1 and ReEl 2 by using the FDMA mode and the SC-OFDMA mode respectively. ReEl 3 and ReEl 4 are guard intervals. A time length of ReEl 3 and a time length of ReEl 4 are T3 and T4 respectively. The guard intervals are mainly designed for a switching delay when the base station switches between different multiple access modes and designed for a timing requirement of uplink transmission. T3 is larger than T4 in this implementation because switching delay and timing are both taken into account for T3 whereas only switching delay is taken into account for T4.

Unequal guard intervals may allow more time domain resources to be reserved for a certain resource unit considering that different multiple access modes may have different transmission rates; or different guard intervals may be designed to meet different transmission timing precision requirements; or different guard intervals are required when applied to different coverage areas. To simplify the design of lengths of the guard intervals, it is feasible to specify that the time length of ReEl 3 and the time length of ReEl 4 are proportional to those of ReEl 2 and ReEl 1 respectively or it is feasible to specify that the time length of ReEl 3 and the time length of ReEl 4 are proportional to those of ReEl 1 and ReEl 2 respectively. In this implementation, FDMA has a lower spectral efficiency and requires a lower timing precision. Therefore, a smaller guard interval is designed and more time domain resources are allocated for data transmission.

Implementation 6.2:
This implementation assumes an uplink NB-IOT transmission. A first RAT and a second RAT use the SC-OFDMA mode and the FDMA mode based on GMSK modulation respectively. In this implementation, an RRC connection of a terminal has not been established. The terminal detects a system message sent by a base station. The terminal decides to use the first RAT or the second RAT according to the system message, or a terminal that cannot support two RATs simultaneously determines, according to the system message, whether to use a RAT supported by the terminal to send data. The terminal processes data after selecting a RAT, and sends data on a corresponding first or second resource unit.

Implementation 6.3:
This implementation assumes an uplink NB-IOT transmission. A first RAT and a second RAT use the SC-OFDMA mode and the FDMA mode based on GMSK modulation respectively. In this implementation, an RRC connection of a terminal has not been established. The terminal performs a channel measurement, such as a Reference Signal Received Power (RSRP) measurement, to determine a channel condition. The terminal determines a level of repeat times according to a measurement result, selects a RAT and then processes data. In this implementation, after the measurement, the terminal finds that the channel condition is poor, so the terminal selects the first RAT and sends data on a corresponding first resource unit. The first RAT has a higher spectral efficiency than the second RAT. When the first RAT is used in a low signal-noise ratio, more data is transmitted or the transmission bit rate is reduced, thereby ensuring data transmission of the terminal.

Implementation 6.4:
This implementation assumes an uplink NB-IOT transmission. A first RAT and a second RAT use the SC-OFDMA mode and the FDMA mode based on GMSK modulation respectively. In this implementation, an RRC connection of a terminal has not been established. The terminal performs a channel measurement, such as a Reference Signal Received Power (RSRP) measurement, to determine a channel condition. The terminal selects a RAT according to a measurement result and then processes data. In this implementation, after the measurement, the terminal finds that the channel condition is poor and accordingly determines that the terminal is in a deep-coverage area. Thus, the terminal selects the second RAT and sends data on a corresponding second resource unit. UEs in deep coverage require a higher transmit power. The FDMA mode based on GMSK modulation has a relatively low PAPR, ensuring coverage of low-cost UEs. Additionally, the FDMA mode does not require a high timing precision, reducing synchronization overheads and improving system capacity.

Implementation 6.5:

This implementation assumes an uplink NB-IOT transmission. A first RAT and a second RAT use the SC-OFDMA mode and the FDMA mode based on GMSK modulation respectively. In this implementation, an RRC connection of a terminal has been established. The terminal detects a configuration message sent by a base station. The terminal decides to use the first RAT or the second RAT according to the configuration message, or a terminal that cannot support two RATs simultaneously determines, according to the configuration message, whether to use a RAT supported by the terminal to send data. The configuration information may be information about a level of transmission repeat times. The terminal processes data after selecting a RAT, and sends data on a corresponding first or second resource unit.

Preferred Embodiment 7

In this embodiment, according to different supported RAT types, that is, according to different terminal capabilities, terminals are divided into two types: a first type of terminals that support an SC-OFDMA mode having a sub-carrier spacing of 3.75 kHz and using a single carrier for data transmission, and a second type of terminals that support an SC-OFDMA mode having a sub-carrier spacing of 15 kHz and using a single carrier and multiple carriers for data transmission. Alternatively, terminals are divided into two types: a first type of terminals that support an SC-OFDMA mode using a single carrier for data transmission and having sub-carrier spacings of 3.75 kHz and 15 kHz, and a second type of terminals that support an SC-OFDMA mode using multiple carriers for data transmission and having a sub-carrier spacing of 15 kHz. Alternatively, terminals are divided into three types: a first type of terminals that support an SC-OFDMA mode using a single carrier for data transmission and having a sub-carrier spacing of 3.75 kHz, a second type of terminals that support an SC-OFDMA mode using a single carrier for data transmission and having a sub-carrier spacing of 15 kHz, and a third type of terminals that support an SC-OFDMA mode using multiple carriers for data transmission and having a sub-carrier spacing of 15 kHz.

Preferred Embodiment 8

In this embodiment, a base station allocates different resource units, namely, physical random access channel (PRACH) resources 1/2/3, which correspond to terminal capabilities 1/2/3 respectively. That is, terminals with terminal capabilities of 1/2/3 access a network by using PRACH resources 1/2/3 respectively. For details about division of terminal capabilities 1/2/3, see embodiment 7. The base station receives, on the PRACH resource 1, data sent by a terminal, and uses a RAT corresponding to the terminal capability 1 to demodulate and decode data. After determining the terminal capability 1 and its corresponding RAT, the base station schedules resources, allocates a corresponding resource to the terminal, and sends configuration information to the terminal on a corresponding resource unit, where the configuration information is used for data processing and resource selection for uplink transmission of the terminal.

Preferred Embodiment 9

In this embodiment, a base station allocates different resource units, namely, physical random access channel (PRACH) resources 1/2/3, which correspond to terminal capabilities 1/2/3 respectively. That is, terminals with terminal capabilities of 1/2/3 access a network by using PRACH resources 1/2/3 respectively. For details about division of terminal capabilities 1/2/3, see embodiment 7. In this embodiment, a terminal with a terminal capability of 1 accesses the network on a PRACH 1. A terminal sends data on a corresponding resource according to its own terminal capability. The terminal also receives, on a corresponding resource unit, configuration information sent by the base station, and performs an uplink data processing and selects a resource location according to the configuration information.

The preferred embodiments of the present disclosure provide a multi-RAT merging solution that enables a system to switch between different RATs flexibly and is compatible with different RATs with relatively low complexity and overheads. The different RATs meet different system design requirements, improve system throughput, ensure system coverage, reduce transmission delays and limit terminal costs.

From the description of the embodiments described above, it will be apparent to those skilled in the art that the method of any embodiment described above may be implemented by means of software plus a necessary general-purpose hardware platform, or may of course be implemented by hardware, but in many cases, the former is a preferred implementation mode. Based on this understanding, the solution provided by the present disclosure substantially, or the part contributing to the related art, may be embodied in the form of a software product. The software product is stored on a storage medium (such as a ROM/RAM, a magnetic disk or an optical disk) and includes several instructions for enabling a terminal device (which may be a mobile phone, a computer, a server or a network device) to execute the method according to each embodiment of the present disclosure.

The various modules described above may be implemented by software or hardware. Implementation by hardware may, but may not necessarily, be performed with the following approaches: the various modules described above are located in a same processor or in multiple processors respectively.

An embodiment of the present disclosure further provides a storage medium. In an exemplary embodiment, the storage medium may be configured to store program codes for executing one of or a combination of the steps in the methods described in the above embodiments.

In an exemplary embodiment, the storage medium may include, but is not limited to, a U disk, a read-only memory (ROM), a random access memory (RAM), a mobile hard disk, a magnetic disk, an optical disk or any other medium capable of storing program codes.

In an exemplary embodiment, the processor executes the steps in the methods described in the above embodiments according to the program codes stored in the storage medium.

For specific examples in this embodiment, reference may be made to the examples described in the above embodiments and optional implementations, and the specific examples will not be repeated in this embodiment.

Apparently, those skilled in the art should know that each above-mentioned module or step of the present disclosure may be implemented by a universal computing device, they may be concentrated on a single computing device or distributed in a network formed by multiple computing devices; alternatively, they may be implemented by program codes executable by the computing devices, so that they may be stored in a storage device for execution by the computing devices, and in some circumstances, the illustrated or described steps may be executed in sequences different from those described herein; or they may be made into various integrated circuit modules separately, or multiple modules or steps therein may be made into a single integrated circuit module for implementation. Therefore, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure are within the scope of the present disclosure.

INDUSTRIAL APPLICABILITY

As described above, a data processing method based on a radio access technology, and a transmission node provided by embodiments of the present disclosure have the beneficial effects of solving the problem in merging different radio access technologies, satisfying different design requirements and being compatible with different radio access technologies.

What is claimed is:

1. A data processing method based on a radio access technology, comprising:
   selecting, by a first transmission node, a radio access technology (RAT) according to one of: a coverage level, a frequency domain bandwidth, a resource unit type, a transmission mode, a pre-configuration of the first transmission node, a capability of a second transmission node, and a channel measurement of the second transmission node, wherein the capability of the second transmission node is defined according to an RAT supported by the second transmission node, wherein different coverage levels, different frequency domain bandwidths, different resource unit types, different transmission modes, different pre-configurations of the first transmission node, different channel measurement results of the second transmission node and different capabilities of the second transmission node correspond to different RATs, and wherein a parameter of the selected RAT comprises at least one of: a multiple access mode, a modulation mode, a sub-carrier spacing, or a maximum number of carriers used for carrying data; and
   receiving or sending, by the first transmission node, data on a radio resource unit corresponding to the selected RAT according to the selected RAT.

2. The method of claim 1, wherein the radio resource unit includes a time domain resource unit or a frequency domain resource unit.

3. The method of claim 1, wherein the radio resource unit comprises at least a first resource unit and a second resource unit, and the first resource unit and the second resource unit correspond to different RATs.

4. The method of claim 3, wherein in response to determining that the resource unit is a time domain resource unit, the first resource unit and the second resource unit satisfy at least one of the following relationships in terms of resource locations:
   the first resource unit, a third resource unit and the second resource unit are arranged in sequence of incremental resource index numbers;
   the second resource unit, a fourth resource unit and the first resource unit are arranged in sequence of incremental resource index numbers; or
   at least one child resource unit in the third resource unit and the fourth resource unit does not receive data, or at least one of the third resource unit or the fourth resource unit is a special subframe, wherein a resource size of the child resource unit is smaller than a resource size of the radio resource unit.

5. The method of claim 4, wherein a resource length of the third resource unit and a resource length of the fourth resource unit satisfy at least one of:
   the resource length of the third resource unit is not equal to the resource length of the fourth resource unit;
   the resource length of the third resource unit is equal to the resource length of the fourth resource unit;
   one of the resource length of the third resource unit and the resource length of the fourth resource unit is 0;
   the resource length of the third resource unit and the resource length of the fourth resource unit are determined according to the second resource unit and the first resource unit respectively, or the resource length of the third resource unit and the resource length of the fourth resource unit are determined according to an RAT corresponding to the second resource unit and an RAT corresponding to the first resource unit respectively;
   the resource length of the third resource unit and the resource length of the fourth resource unit are determined according to the first resource unit and the second resource unit respectively, or the resource length of the third resource unit and the resource length of the fourth resource unit are determined according to the RAT corresponding to the first resource unit and the RAT corresponding to the second resource unit respectively; or
   the resource length of the third resource unit and the resource length of the fourth resource unit are configured through signaling.

6. The method of claim 4, wherein a resource length of the first resource unit, a resource length of the second resource unit, a resource length of the third resource unit and a resource length of the fourth resource unit satisfy at least one of:
   at least one of the resource length of the first resource unit, the resource length of the second resource unit, the resource length of the third resource unit or the resource length of the fourth resource unit is an integral multiple of a first basic length unit;
   a sum of two of the resource length of the first resource unit, the resource length of the second resource unit and the resource length of the third resource unit is an integral multiple of a second basic length unit;
   a sum of two of the resource length of the first resource unit, the resource length of the second resource unit and the resource length of the fourth resource unit is an integral multiple of the second basic length unit;

a sum of three of the resource length of the first resource unit, the resource length of the second resource unit, the resource length of the third resource unit and the resource length of the fourth resource unit is an integral multiple of a third basic length unit;

the resource length of the third resource unit and the resource length of the first resource unit satisfy a specified ratio, or the resource length of the third resource unit and the resource length of the second resource unit satisfy a specified ratio; or the resource length of the fourth resource unit and the resource length of the first resource unit satisfy a specified ratio, or the resource length of the fourth resource unit and the resource length of the second resource unit satisfy a specified ratio.

7. The method of claim 1, wherein selecting, by the first transmission node, the RAT according to the coverage level comprises:

selecting a first RAT in response to determining that the coverage level is a level A and selecting a second RAT in response to determining that the coverage level is a level B, wherein each of the level A and the level B corresponds to a specified coverage area; or selecting, by the first transmission node, the RAT according to the frequency domain bandwidth comprises:

in response to determining that the resource unit is a frequency domain resource unit, selecting a third RAT in response to determining that the frequency domain bandwidth f satisfies f<F1 and selecting a fourth RAT in response to determining that the frequency domain bandwidth f satisfies f>F2, wherein F1 and F2 are both real numbers greater than 0 and F2≥F1; or selecting, by the first transmission node, the RAT according to the resource unit type comprises:

selecting a fifth RAT in response to determining that the resource unit type is a first resource unit and selecting a sixth RAT in response to determining that the resource unit type is a second resource unit.

8. The method of claim 1, wherein in response to determining that the resource unit is a frequency domain resource unit, a first resource unit and a second resource unit satisfy at least one of the following relationships:

the first resource unit is located at both sides of the second resource unit in frequency domain;

the second resource unit is located at both sides of the first resource unit in frequency domain; or the first resource unit and the second resource unit satisfy at least one of the following relationships in time domain;

a length of the first resource unit is S1/S2 times of a length of the second resource unit; or a length of the second resource unit is S1/S2 times of a length of the first resource unit, wherein S1 and S2 are integers greater than 0.

9. The method of claim 1, comprising at least one of:

distinguishing the capability of the second transmission node according to the resource unit type, and receiving data according to the capability of the second transmission node; or determining the resource unit type according to the capability of the second transmission node, and sending configuration information to the second transmission node on the radio resource unit, wherein the configuration information is used for configuration of a data transmission of the second transmission node.

10. A data processing method based on a radio access technology, comprising:

selecting, by a second transmission node, a radio access technology (RAT) according to one of: a coverage level, a frequency domain bandwidth, a resource unit type, a transmission mode, a configuration of a first transmission node, a measurement of the second transmission node, and a capability of the second transmission node, wherein the capability of the second transmission node is defined according to an RAT supported by the second transmission node, wherein different coverage levels, different frequency domain bandwidths, different resource unit types, different transmission modes, different configurations of the first transmission node, different channel measurement results of the second transmission node and different capabilities of the second transmission node correspond to different RATs, and wherein a parameter of the selected RAT comprises at least one of: a multiple access mode, a modulation mode, a sub-carrier spacing, or a maximum number of carriers used for carrying data; and sending or receiving, by the second transmission node, data on a radio resource unit corresponding to the selected RAT according to the selected RAT.

11. The method of claim 10, wherein the radio resource unit comprises a time domain resource unit or a frequency domain resource unit.

12. The method of claim 10, wherein the radio resource unit comprises at least a first resource unit and a second resource unit, and the first resource unit and the second resource unit correspond to different RATs.

13. The method of claim 12, wherein in response to determining that the resource unit is a time domain resource unit, the first resource unit and the second resource unit satisfy at least one of the following relationships in terms of resource locations:

the first resource unit, a third resource unit and the second resource unit are arranged in sequence of incremental resource index numbers;

the second resource unit, a fourth resource unit and the first resource unit are arranged in sequence of incremental resource index numbers; or at least one child resource unit in the third resource unit and the fourth resource unit does not send data, or at least one of the third resource unit or the fourth resource unit is a special subframe, wherein a resource size of the child resource unit is smaller than a resource size of the radio resource unit.

14. The method of claim 13, wherein a resource length of the third resource unit and a resource length of the fourth resource unit satisfy at least one of:

the resource length of the third resource unit is not equal to the resource length of the fourth resource unit;

the resource length of the third resource unit is equal to the resource length of the fourth resource unit;

one of the resource length of the third resource unit and the resource length of the fourth resource unit is 0;

the resource length of the third resource unit and the resource length of the fourth resource unit are determined according to the second resource unit and the first resource unit respectively, or the resource length of the third resource unit and the resource length of the fourth resource unit are determined according to an RAT corresponding to the second resource unit and an RAT corresponding to the first resource unit respectively;

the resource length of the third resource unit and the resource length of the fourth resource unit are determined according to the first resource unit and the second resource unit respectively, or the resource length of the third resource unit and the resource length of the fourth resource unit are determined according to the RAT corresponding to the first resource unit and the RAT corresponding to the second resource unit respectively; or the resource length of the third resource unit and the resource length of the fourth resource unit are configured through signaling.

15. The method of claim 13, wherein a resource length of the first resource unit, a resource length of the second resource unit, a resource length of the third resource unit and a resource length of the fourth resource unit satisfy at least one of:

at least one of the resource length of the first resource unit, the resource length of the second resource unit, the resource length of the third resource unit or the resource length of the fourth resource unit is an integral multiple of a first basic length unit;

a sum of two of the resource length of the first resource unit, the resource length of the second resource unit and the resource length of the third resource unit is an integral multiple of a second basic length unit;

a sum of two of the resource length of the first resource unit, the resource length of the second resource unit and the resource length of the fourth resource unit is an integral multiple of the second basic length unit;

a sum of three of the resource length of the first resource unit, the resource length of the second resource unit, the resource length of the third resource unit and the resource length of the fourth resource unit is an integral multiple of a third basic length unit;

the resource length of the third resource unit and the resource length of the first resource unit satisfy a specified ratio, or the resource length of the fourth resource unit and the resource length of the second resource unit satisfy a specified ratio; or the resource length of the fourth resource unit and the resource length of the first resource unit satisfy a specified ratio, or the resource length of the fourth resource unit and the resource length of the second resource unit satisfy a specified ratio.

16. The method of claim 10, wherein selecting, by the second transmission node, the RAT according to the coverage level comprises:

selecting a first RAT in response to determining that the coverage level is a level A and selecting a second RAT in response to determining that the coverage level is a level B, wherein each of the level A and the level B corresponds to a specified coverage area; or selecting, by the second transmission node, the RAT according to the frequency domain bandwidth comprises:

in response to determining that the resource unit is a frequency domain resource unit, selecting a third RAT in response to determining that the frequency domain bandwidth f satisfies f<F1 and selecting a fourth RAT in response to determining that the frequency domain bandwidth f satisfies f>F2, wherein F1 and F2 are both real numbers greater than 0 and F2≥F1; or selecting, by the second transmission node, the RAT according to the resource unit type comprises:

selecting a fifth RAT in response to determining that the resource unit type is a first resource unit and selecting a sixth RAT in response to determining that the resource unit type is a second resource unit.

17. The method of claim 10, wherein in response to determining that the resource unit is a frequency domain resource unit, a first resource unit and a second resource unit satisfy at least one of the following relationships:

the first resource unit is located at both sides of the second resource unit in frequency domain;

the second resource unit is located at both sides of the first resource unit in frequency domain; or the first resource unit and the second resource unit satisfy at least one of the following relationships in time domain:

a length of the first resource unit is S1/S2 times of a length of the second resource unit; or a length of the second resource unit is S1/S2 times of a length of the first resource unit, wherein S1 and S2 are integers greater than 0.

18. The method of claim 10, wherein selecting, by the second transmission node, the RAT comprises at least one of:

in response to determining that a radio resource control (RRC) connection of the second transmission node has not been established, selecting the RAT according to the channel measurement or according to configuration information sent by the first transmission node; or in response to determining that the RRC connection of the second transmission node has been established, selecting the RAT according to the configuration information sent by the first transmission node.

19. The method of claim 10, comprising at least one of:

further selecting, by the second transmission node, the resource unit type according to the capability of the second transmission node and sending data by the second transmission node on the radio resource unit; or receiving, by the second transmission node, configuration information sent by a first transmission node and performing an uplink data transmission by the second transmission node according to the configuration information.

20. A transmission node, comprising a processor and a memory which stores a program thereon, wherein the program, when being executed by the processor, cause the processor to:

select a radio access technology (RAT) according to one of: a coverage level, a frequency domain bandwidth, a resource unit type, a transmission mode, a configuration of a first node, a channel measurement of a second transmission node, and a capability of a second transmission node, wherein the capability of the second transmission node is defined according to an RAT supported by the second transmission node, wherein different coverage levels, different frequency domain bandwidths, different resource unit types, different transmission modes, different configurations of the first transmission node, different channel measurement results of the second transmission node and different capabilities of the second transmission node correspond to different RATs, and wherein a parameter of the selected RAT comprises at least one of: a multiple access mode, a modulation mode, a sub-carrier spacing, or a maximum number of carriers used for carrying data; and send or receive data on a radio resource unit corresponding to the selected RAT according to the selected RAT.

* * * * *

UNITED STATES PATENT AND TRADEMARK OFFICE
CERTIFICATE OF CORRECTION

PATENT NO. : 11,134,495 B2  
APPLICATION NO. : 15/780216  
DATED : September 28, 2021  
INVENTOR(S) : Zewei Chen et al.

Page 1 of 1

It is certified that error appears in the above-identified patent and that said Letters Patent is hereby corrected as shown below:

In the Specification

In Column 1, Line 39 (approx.), delete "FMDA" and insert --FDMA--.

In Column 1, Line 51, delete "FMDA" and insert --FDMA--.

In Column 1, Line 55, delete "FMDA" and insert --FDMA--.

In Column 1, Line 60, delete "FMDA" and insert --FDMA--.

In Column 1, Line 63, delete "FMDA" and insert --FDMA--.

In the Claims

In Column 25, Line 53, Claim 8, delete "domain;" and insert --domain:--.

In Column 26, Line 9 (approx.), Claim 10, delete "a" and insert --a channel--.

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*